United States Patent Office 3,118,849
Patented Jan. 21, 1964

3,118,849
AQUEOUS PRINTING COMPOSITION COMPRISING TITANIUM DIOXIDE, A POLYMERIC BINDING AGENT AND POLYMETHYLENE UREA, AND PROCESS FOR THE PRINTING AND DYEING OF TEXTILES THEREWITH
Kuno Wagner and Richard Schwaebel, Leverkusen, Germany, assignors to Farbenfabriken Bayer Aktiengesellschaft, Leverkusen, Germany, a corporation of Germany
No Drawing. Filed Feb. 3, 1960, Ser. No. 6,368
Claims priority, application Germany Feb. 24, 1959
7 Claims. (Cl. 260—29.4)

The present invention relates to an improved process for dyeing and printing of textiles with polymeric film formers and, if desired, cross-linking agents, and with the use of titanium dioxide; the improvement consists in the additional use of polymethylene ureas of the formula

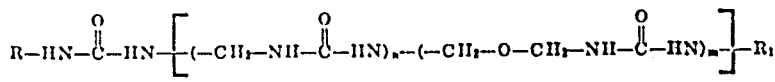

in said dyeing and printing process. In the general formula R and $R_1$ stand for radicals selected from the group consisting of hydrogen, methylol and methylol ether groups and wherein $m$ and $n$ are whole numbers and $n+m$ are at least 4.

It is known that for the fixation of titanium dioxide on textiles high molecular weight substances are used as binding agents (polymeric film formers) which are applied either in the dissolved or emulsified form or also in combination with water-soluble or water-dispersible cross-linking agents such as methylol compounds of urea, acid amides, aminotriazines or their functional derivatives, for example their etherification products with monohydric or polyhydric alcohols. In the case of high pigmentation with titanium dioxide and increased covering power of the prints, the general fastness properties, such as the fastness to dry and wet rubbing and to solvents, are not fully satisfactory, since the stability of the binding agents used is diminished by a high titanium dioxide content.

In accordance with this invention it has now been found that pigment prints based on titanium dioxide and having a high covering power and improved properties can be produced by adding polymethylene ureas insoluble in water and usual organic solvents and having the formula

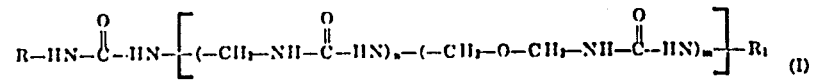 (I)

wherein R, $R_1$ denote hydrogen, methylol and/or methylol ether groups, $n$ and $m$ represent whole numbers and $n+m$ are at least 4, to white printing pastes consisting of polymeric film formers, which may contain the usual reactive cross-linking agents, titanium dioxide and thickeners while attaining a good covering power of the pigmentations thus obtained. In this way it is possible to keep the titanium dioxide content low so that an improved stability of the polymeric film formers used is brought about, while attaining a good covering power of the pigmentations thus obtained. The prints produced according to this process exhibit at a substantially reduced amount of titanium dioxide the same covering power, levelness and plastic effect as has been hitherto achieved by known methods with a very high titanium dioxide content. In addition to improved fastness properties and printing advantages, the prints obtained according to the invention are especially distinguished by their fastness to solvents such as are usually employed for dry-cleaning.

The polymethylene ureas added to the titanium dioxide printing pastes according to the invention are powdered white compounds, insoluble in water and all polar and non-polar organic solvents, which are completely resistant to the chlorinated hydrocarbons used for dry-cleaning and can be dissolved only in special so-called salt-solvents such as concentrated solutions of lithium iodide in methanol or magnesium perchlorate in water. They are distinguished by an excellent fastness to light and characterized in that the urea groupings they contain are bound via methylene and/or methylene ether groupings and that no methylol groups are linked to their secondary NH groups within the chain. They are produced by known methods from urea and formaldehyde, monomethylol urea or, at a suitable dilution from dimethylol urea with splitting off water and $CH_2O$, by strongly acid condensation, preferably at pH values of 1 to 2. The preparation of polymethylene ureas used is described, e.g., in the dissertation by Kuno Wagner "Zur Konstitution der Harnstoff- und Thioharnstoff-Formaldehyd Kondensate," Freiburg, Germany, 1954, pages 38 to 45. Depending on the method of production, they may possess amide, methylol and/or methylol ether groups as terminal groups. Preferred compounds are those in which the sum $m+n$ of the general formula is more than 7.

Polymethylene ureas of the Formula I are distinguished from the precondensation products designated as "urea-formaldehyde resins" or their hardening products chiefly by their great number of NH groups and their relatively low formaldehyde content. They exhibit a good compatibility with titanium dioxide and they lead to an increased fixation of the pigments on the fibrous material.

The polymethylene ureas may be admixed with the titanium dioxide, but they may also be used separately, for example by adding them to the titanium dioxide printing pastes in a finely dispersed form or also by adding them to the printing pastes as emulsions of the hydrocarbon-in-water or water-in-hydrocarbon type.

The fixation of the mixture of polymethylene urea and titanium dioxide pigments is carried out by known methods, i.e. the pigment is fixed on the textiles by dyeing or printing in the presence of polymeric film-formers and, if desired, usual reactive cross-linking agents, at an elevated temperature and preferably in the presence of agents splitting off acid. Dyeing and printing processes and binding agents which may be applied are known to a great extent. For illustrating the possible variation only the following few references will be cited without restricting the present process to the methods and constituents given therein: U.S. patent specifications 2,886,474, 2,883,304, 2,558,053, 2,780,562, 2,779,686, 2,800,417, 2,903,436, 2,897,101, copending U.S. patent applications Ser. No. 578,571 by Wilhelm Graulich, Wolfgang Lehmann, Otto Bayer, Wilhelm Kass, Wilhelm Berlenbach filed on April 17, 1956, now Patent No. 3,062,686; Ser. No. 694,751 by Kuno Wagner, Richard Schwaebel, Wilhelm Graulich filed on November 6, 1957; Ser. No. 699,181 by Kuno Wagner, Richard Schwaebel, Wilhelm Kass, Wilhelm Graulich, Helmut Kleiner filed on November 27, 1957, which applications have been assigned to the same assignee; and British patent specification 620,791.

Of the class of useful polymeric film-formers there may be mentioned for example the known co-polymerisation products of vinyl polymers such as acrylic acid esters, methacrylamide, styrene, vinyl chloride, vinylidene chloride, vinyl ester, butadiene, isoprene and the like, and also from methacrylamide-methylol methyl ether and butadiene, acrylic acid butyl ester, styrene and acrylonitrile; other suitable polymeric film formers are polyethylene dispersions, polyurethanes modified with isocyanates, latices containing polyvinylacetales, vinylpolymerisates having incorporated copolymerisates of vinyloxyethylurea, 1,2-vinyloxypropyl-2-imidazolidone and copolymerisates of vinyl compounds and glycidylesters, acrylic acid and methacrylic acid.

As cross-linking components there may be mentioned for example latices with reactive, cross-linking groups, such as carboxylic acid groups, or methylol group-containing cross-linking agents such as the known water-soluble condensation products from aldehydes, particularly formaldehyde, and amines such as aminotriazines or ureas, furthermore methylol group-containing reaction products from polymethylol compounds of urea and hydroxyethylated polyfunctional alcohols. Useful polymeric film formers and cross-linking agents are disclosed, inter alia, in the above indicated patents and applications.

Finally, the printing pastes may include usual hydrophobing agents, plasticizers and thickeners such as tragacanth, starch, cellulose ether, polyvinyl alcohol, polyacrylamide and the ammonium salt of polyacrylic acid, as are commonly used in the dyeing and printing of textiles in combination with synthetic binding materials. The printing pastes may also be applied as emulsions of the oil-in-water or water-in-oil type, for example benzene thickenings. These emulsions are likewise well-known from literature.

The amount of polymethylene ureas added to the printing pastes with regard to titanium dioxide may vary within wide limits, for example 10:100, 25:100, 45:100, 50:100, 65:100, 150:100 or 200:100. The combinations of polymethylene ureas and titanium dioxide may also be used in combination with colored pigments, for example copper phthalocyanines, carbon black and the like, in order to obtain delustred-colored effects or half-tone reserves. The entire amount of organic or inorganic pigments added to the printing paste or dyeing liquor is about 0.1% to about 30% referred to the weight of the paste or liquor. They may be used for film or machine printing as well as for discharge printing.

In addition to the aforesaid advantages obtained by the use of polymethylene ureas, the new process ensures in spite of the high pigment content good flowing properties in machine and film printing and also good compatibility with the usual commercial reducing agents in discharge printing pastes without impairing the feel of the printed fabric.

By the term textiles there are to be understood textile materials, such as yarns, fabrics and the like, made from fibres of natural or synthetic origin, such as cotton, regenerated cellulose, wool, polymerisates and copolymerisates of acrylonitrile, aromatic polyesters, e.g. polyethylene terephthalates, synthetic polyamides, glass-fibre fabrics and polyurethanes, and so on.

The following examples are given for the purpose of illustrating the invention without, however, limiting it thereto.

*Example 1*

Cotton is printed with a printing paste of the following composition:

150 parts by weight of titanium dioxide
50 parts by weight of insoluble finely powdered polymethylene ureas, prepared from 1 mol of urea and 1 mol of formaldehyde at pH 1 and room temperature, corresponding to a mixture of compounds of the Formula I given in column 1 with R=H, $R_1$= —$CH_2$—OH, $n$=8–12 and $m$=1–2.

60 parts by weight of ethylene glycol
500 parts by weight of a 40% aqueous co-polymerisation product consisting of butadiene, acrylic acid butyl ester, styrene, acrylonitrile and methacrylamide (30:30:6:2)
65 parts by weight of a 71.4% aqueous solution of a trimethylol-urea-hexanetriol - butanedihydroxyethyl-glycol-polyether (melting viscosity 10,000 cp. at 75° C.)
100 parts by weight of a 37% aqueous methylcellulose solution
30 parts by weight of a 25% ammonium chloride solution
45 parts by weight of water ---
1000 parts by weight After printing and fixing at temperatures of about 100–150° C., plastic and level prints of sharp outlines are obtained. The well covering white prints thus obtained are distinguished by an excellent stability to ageing, even after prolonged exposure to light, and exhibit a good fastness to washing, rubbing and to solvents.

*Example 2*

A fabric is printed with a printing paste of the following composition:

140 parts by weight of titanium dioxide
60 parts by weight of polymethylene urea, prepared at 60° C. from 1 mol of urea and 1 mol of formaldehyde at pH 1, corresponding to a mixture of compounds of the Formula I in column 1 with R and $R_1$=H, $n$=7–13 and $m$=0–1
40 parts by weight of ethylene glycol
520 parts by weight of a 40% aqueous latex containing a copolymerisation product from butadiene, acrylonitrile, styrene and methacrylamide-methylol methyl ether (40:36:20:4)
65 parts by weight of a trimethylolurea-hexanetriol-butane-dihydroxy-ethylglycol polyether modified by basically catalytic condensation with hexamethylolmelamine in a 71.4% solution in water and hexanetriol (1:1)
100 parts by weight of a 37% methylcellulose solution
30 parts by weight of a 25% ammonium chloride solution
45 parts by weight of water ---
1000 parts by weight After printing and fixing silimarly to Example 1, there are obtained on cellulose, rayon, acetate rayon, polyacrylonitrile and polyester fabrics prints of sharp outlines having the same good fastness properties as those of Example 1.

*Example 3*

A fabric is printed with a printing paste of the following composition:

140 parts by weight of titanium dioxide
30 parts by weight of a 30% aqueous copper-phthalocyanine dispersion or
30 parts by weight of a 30% aqueous emulsion of the yellow azo dyestuff prepared from tetrazotized 3,3'-dichloro-4,4'-diaminodiphenyl and acetoacetic acid m-xylidid
60 parts by weight of polymethyleneurea, prepared from dimethylol-urea at room temperature and pH 2 in a dilute solution, corresponding to a mixture of compounds of the Formula I in column 1 with R=H, $R_1$= —$CH_2$—OH, $n$=8–12 and $m$=1–2
40 parts by weight of ethyleneglycol 520 parts by weight of a 40% aqueous latex containing a copolymerisation product from butadiene, acrylonitrile, styrene and methacrylamide-methylol methyl ether (40:36:20:4)
65 parts by weight of a 71.4% aqueous solution of a trimethylolurea - hexanetriol - butane - dihydroxyethylglycol polyether of melting viscosity 10,000 cp. at 75° C.
100 parts by weight of a 37% methylcellulose solution
30 parts by weight of a 25% ammonium chloride solution
15 parts by weight of water 1000 parts by weight After printing and fixing similarly to Example 1, sharp delustred color prints are obtained which are fast to ageing, rubbing, washing and solvents.

Example 4

Cellulose is printed with a printing paste of the following composition:

140 parts by weight of titanium dioxide
60 parts by weight of polymethylene urea, prepared from 1 mol of urea and 1 mol of formaldehyde at pH 1 and 65° C., corresponding to a mixture of compounds of the formula in column 1 with R and $R_1=H$, $Y=12-20$ and $Z=0-3$
40 parts by weight of ethyleneglycol
520 parts by weight of a 40% aqueous co-polymerisation product from butadiene, acrylic acid butyl ester, styrene, acrylonitrile, and methacrylamide (30:30:30:6:2)
65 parts by weight of a 71.4% aqueous solution of a trimethylol - urea - hexanetriol - butanedihydroxyethylglycol polyether (melting viscosity 10,000 cp. at 75° C.)
100 parts by weight of a 37% methyl cellulose solution
30 parts by weight of a 25% ammonium chloride solution
45 parts by weight of water 1000 parts by weight Similarly to Example 2, prints of sharp outlines with good fastness properties are obtained on fabrics such as cellulose.

The 40% aqueous co-polymerisation product used in this example may be replaced with the same good result by 500 parts by weight of a 40% aqueous co-polymerisation product from
60 parts by weight of asymmetric-dichlorethene
30 parts by weight of acrylic acid butylester and
10 parts by weight of methacrylamide The polymethylene urea may be replaced in the above process by 60 parts by weight of an insoluble, finely powdered polymethylene urea prepared from monomethylene urea in methanol in the ratio of 5–1 at pH 1 which corresponds to a mixture of compounds of the Formula I in column 1 with $r=H$, $R_1=$ —CH$_2$OCH$_3$ and $n=10-15$ and $m=1-2$.

Example 5

A fabric is printed with a printing paste of the following composition:

140 parts by weight of titanium dioxide
30 parts by weight of tetrachloro-copperphthalocyanine in a 30% aqueous suspension
60 parts by weight of polymethylene urea as described in Example 4
40 parts by weight of ethylene glycol
520 parts by weight of a 40% aqueous latex consisting of butylacrylate and asymmetric dichlorethene (60:40)
65 parts by weight of a 71.4% aqueous solution of a trimethylol - urea - hexanetriol - butanedihydroxyethylglycol polyether (melting viscosity 10,000 cp. at 75° C.)
100 parts by weight of a 37% methylcellulose solution
30 parts by weight of a 25% ammonium chloride solution
15 parts by weight of water 1000 parts by weight After printing, drying and fixing similarly to Example 1, there is obtained a delustred-coloured print of sharp outlines which is fast to ageing, rubbing and washing.

Example 6

Cotton fabric is printed with a printing paste consisting of 140 parts by weight of a titanium dioxide
60 parts by weight of an insoluble, finely powdered polymethylene urea prepared from 1 mol of urea and 1 mol of formaldehyde at room temperature and at pH 1, corresponding to a mixture of compounds of the Formula I in column 1 with $R=H$, $R_1=$ —CH$_2$OH, $n=8-12$ and $m=1-2$
60 parts by weight of ethylene glycol
500 parts by weight of a 40% aqueous co-polymerisation product from butadiene, acrylic acid butylester, styrene, acrylonitrile and methacrylamide (30:30:30:6:2) and
(a) 65 parts by weight of a 71.4% methanol water solution of a mixture of tetra- and penta- and hexamethylol-melamin (1:1:1) etherified with ethylene glycol, or
(b) 65 parts by weight of a 65% aqueous solution of dimethylol-urea or
(c) 65 parts by weight of a 60% aqueous solution of tetramethylol-hydrazo dicarbonamide etherified with ethylene glycol
100 parts by weight of 37% methyl cellulose solution
30 parts by weight of 25% ammonium chloride solution and
45 parts by weight of water 1000 parts by weight After printing and fixing at a temperature of about 100–150° C. level prints of sharp outlines which exhibit good fastness to ageing, washing, rubbing and to solvents are obtained.

Similar results are obtained if the latex is replaced by 300 parts by weight of a 40% aqueous mixed polymerisate which is partly saponified and which was prepared from ethylene and vinyl acetate (70:30), having an OH number of 110, and 200 parts of a further 40% aqueous copolymerisate prepared from butadiene, acrylic acid-butyl ester, styrene, acrylonitrile and methacrylamide (30:30:30:6:2).

We claim:
1. An aqueous composition for printing textiles comprising titanium dioxide pigment, a polymeric-film forming binding agent and as an additional pigmenting agent which is substantially insoluble in water, polar and nonpolar organic solvents, a compound having the formula

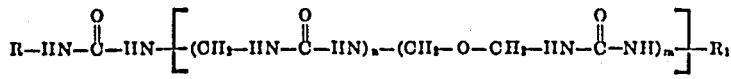

wherein R and R₁ represent radicals selected from the group consisting of hydrogen, methylol and methylol ether groups, and $n$ and $m$ are whole numbers, the sum of which is at least 4.

2. The aqueous composition of claim 1 in which $n$ stands for a number within the range of about 8 to 12 and $m$ stands for a whole number from about 1 to 2.

3. The composition of claim 1 in which the polymethylene urea additional pigmenting agent is finely dispersed in a printing paste.

4. The composition of claim 1 having as a high molecular weight polymeric film-forming binding agent a copolymerization product of vinyl monomers selected from the group consisting of acrylic acid lower alkyl ester, methacrylamide, methacrylamide methylol lower alkyl ether, styrene, butadiene, isoprene, vinyl chloride, vinylidene chloride, vinyl lower alkyl ester and acrylonitrile.

5. The composition of claim 1 additionally containing as a cross-linking agent, a compound selected from the class consisting of trimethylolurea-hexanetriol-butanedihydroxy-ethylglycol-polyether; trimethylolurea-hexanetriol-butanedihydroxy-ethylglycol-polyether modified by basically catalyzed condensation with hexamethylolmelamine in combination with hexanetriol; a mixture of tetra-, penta- and hexamethylol-melamine etherified with ethylene glycol; dimethylolurea; and tetra-methylol-hydrazo dicarbonamide etherified with ethylene glycol.

6. In a process for printing textile materials with an aqueous printing composition comprising titanium dioxide pigment and high molecular weight polymeric film-forming binding agent, the improvement consisting of adding about 10 to 200 parts of a polymethylene urea based on 100 parts of titanium dioxide present in the printing composition, the polymethylene urea being substantially insoluble in water, polar and non-polar organic solvents and having the formula

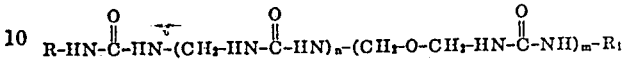

wherein R and R₁ stand for a radical selected from the group consisting of hydrogen, methylol and methylol ether group, and $n$ and $m$ are whole numbers, the sum of $n+m$ being at least 4, whereby the entire amount of pigment in the printing composition is about 0.1% to 30% by weight.

7. The process of claim 6 in which $n$ is a whole number within the range of about 8–12, and $m$ is a whole number within the range of about 1–2.

References Cited in the file of this patent
UNITED STATES PATENTS

| | | |
|---|---|---|
| 2,702,283 | Wilson et al. | Feb. 15, 1955 |
| 2,719,832 | Craemer et al. | Oct. 4, 1955 |
| 2,825,708 | Auer | Mar. 4, 1958 |
| 2,871,213 | Graulich et al. | Jan. 27, 1959 |
| 2,956,907 | Schmitz et al. | Oct. 18, 1960 |